June 27, 1939.  H. B. SLATER  2,164,124
MINERAL SORTING LAUNDER APPARATUS
Filed Nov. 15, 1937  2 Sheets-Sheet 2
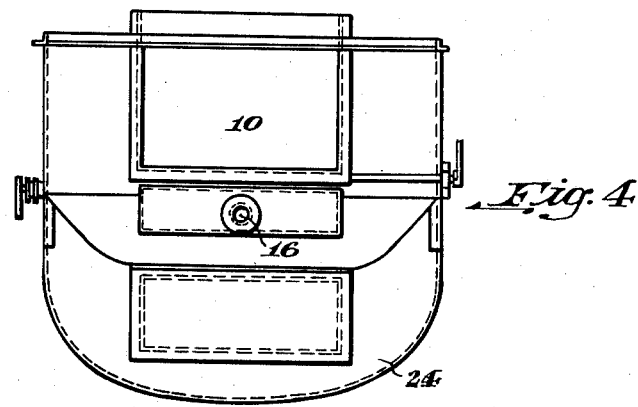
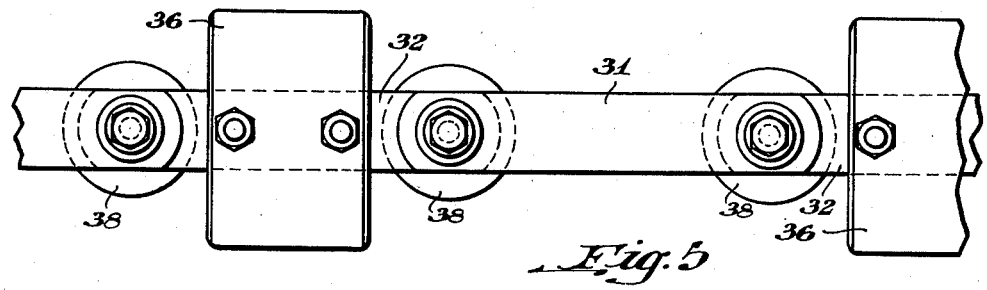
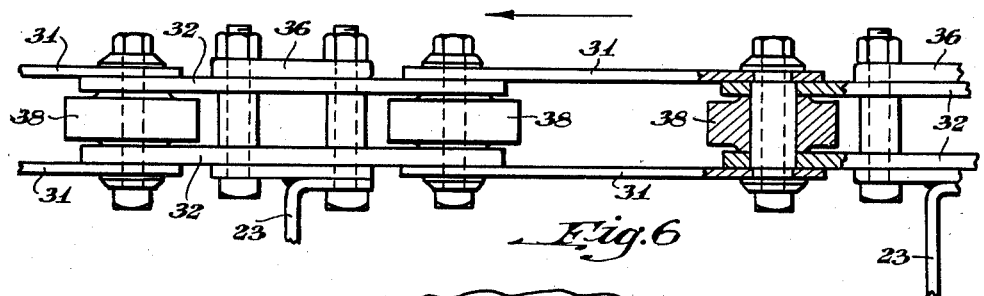
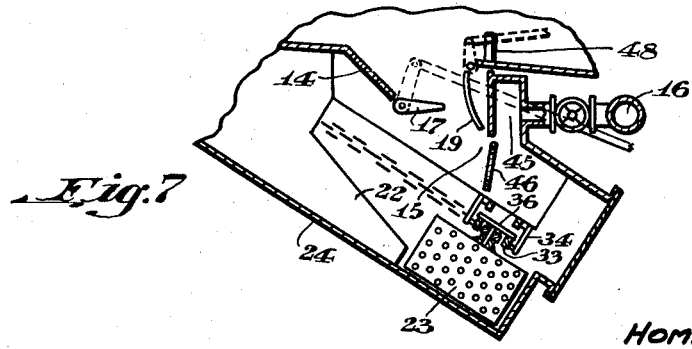
INVENTOR.
HOMER B. SLATER.
BY Henry Love Clarke
ATTORNEY.

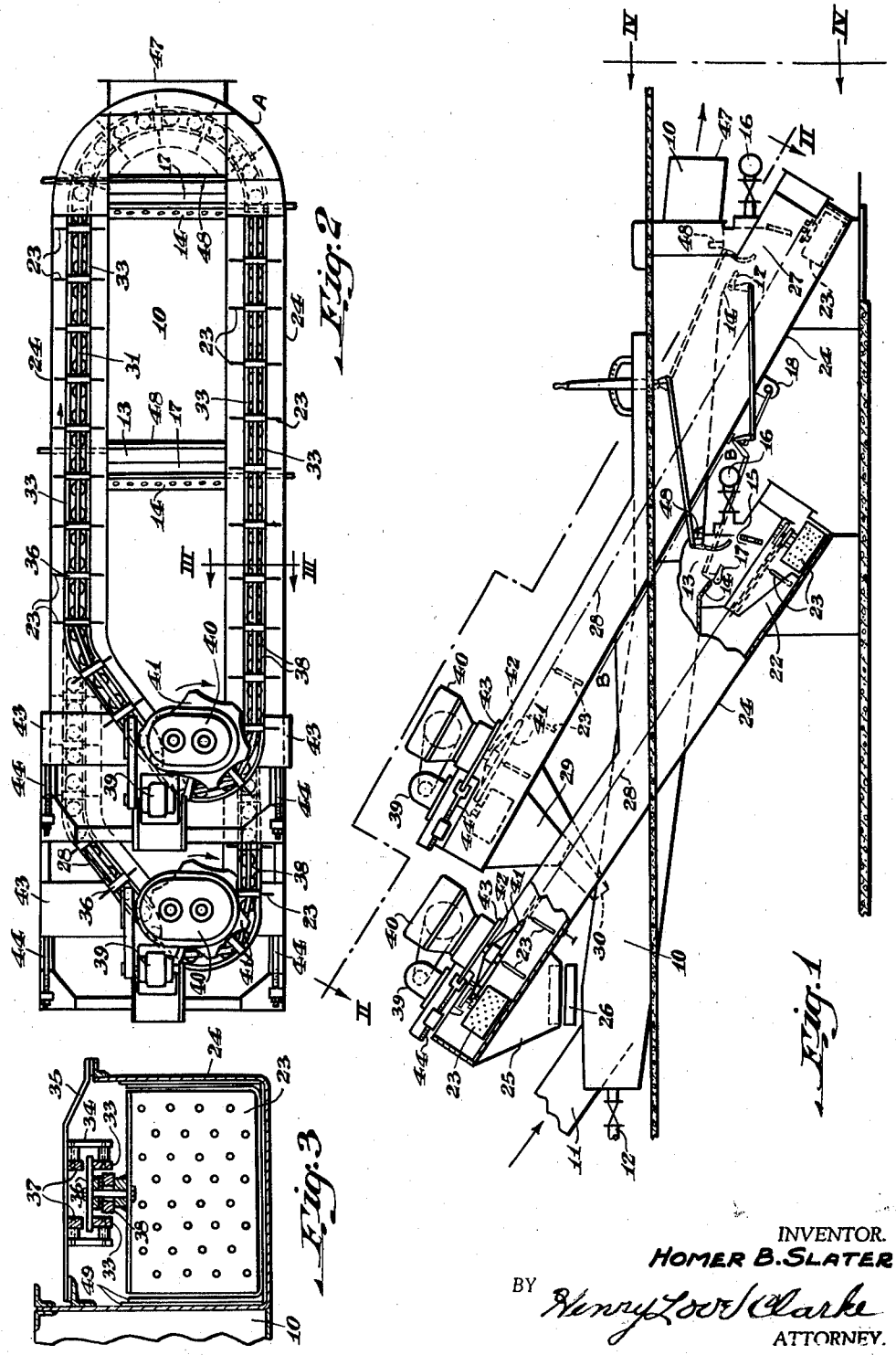

Patented June 27, 1939

2,164,124

UNITED STATES PATENT OFFICE 2,164,124

MINERAL SORTING LAUNDER APPARATUS

Homer B. Slater, Pittsburgh, Pa., assignor to Koppers-Rheolaveur Company, a corporation of Delaware Application November 15, 1937, Serial No. 174,570

6 Claims. (Cl. 209—155)

The present invention relates to the sorting of materials according to their densities and more especially contemplates improvements in apparatus employed for effecting such a separation by means of a flowing current of liquid in which the materials undergoing treatment are entrained in the flowing liquid and under its influence various constituents are stratified according to their densities. More specifically the present improvement is concerned with apparatus of the type in which the flowing liquid is guided through a trough-like member or launder wherein the velocity of said flowing liquid is so regulated that the less dense materials are carried along with the moving liquid and out of the launder whereas the more dense constituents settle in the bottom of said launder and are regulably removed therefrom through suitable and regulable openings in the bottom thereof.

In consequence of the facts that a so processed material is seldom perfectly separated into products having constituents of only the preferred density in one pass through a launder and that it is in most instances desirable or necessary to reprocess at least part of the denser materials that have been removed in regulable quantities from the bottom of said launder by again introducing them thereinto along with new quantities of the untreated materials or into a similarly disposed adjacent launder, conveyor means are required for transporting and elevating said denser materials from beneath the discharge openings therefor in the bottom of a launder to a preferred point thereabove whence they can be sent to an inlet of the same or an adjacent launder. For this purpose conveyor devices of various types have been used in the prior art and one of the objects of the present invention is to provide improved conveyor means for employment in sorting launders using the alluvial principle and also to provide in general such new disposition of conveyors in respect of their associated launders that a washing installation of the stated type employing the invention will be more cheaply and simply constructed; will require a space of significantly less height to accommodate it; and will be more easily installed at the site of erection. The herein-disclosed invention makes it feasible to fabricate and assemble a complete washing unit in the manufacturing plant; to run in and make any necessary adjustments of its working parts; and thereafter without general disassembling of the unit to transport it on existing means to the site of erection in at most a few ready-to-operate sections that can be joined together by a simple weld or two, as will be hereinafter explained. Thus through means provided by the instant improvement, all working parts of a complete unit installation, their driving mechanisms and the like, can be assembled and reduced to final operating condition at the point of fabrication where appropriate devices are conveniently available for so doing, thereby eliminating all operations of that nature in remote fields and all such delays as arise because suitable equipment for these purposes is frequently difficult to obtain there.

Another object of invention is reduction of the distance through which materials requiring rewashing in the launders must be transported, so as to protect them from unnecessary disintegration and also lower the expenditures of power for their transportation.

Another object of invention is reduction of the volume of sorting fluid that requires storage in an operating unit thereby decreasing its total weight and also the demands on its supporting foundation.

A further object of invention is the provision of an improved conveying device and a driving mechanism therefor that are suitable for the practice of the herein-disclosed improvement and also to furnish such disposition of these parts in respect of the launder that they may be substantially standardized regardless of the width of the launder member with which they are to be associated.

In brief, one of the principal objects of the present invention is to contribute to the art of sorting materials in flowing liquids according to their densities, a novel construction for and improved disposition of essential parts which will furnish a washing unit with greater compactness, will simplify its fabrication, and reduce the construction and erection costs thereof, and will also provide, for the products being treated, the shortest possible direct flow-paths through the apparatus, thereby reducing operating costs and improving the quality of the products. The invention has for further objects such other improvements and such other operative advantages or results as may be found to obtain in the processes or apparatus hereinafter described or claimed.

In the accompanying drawings forming a part of this specification and showing for purposes of exemplification a preferred apparatus and method in which the invention may be embodied and practised but without limiting the claimed invention specifically to such illustrative instance or instances:

Figure 1 is a diagrammatical elevational view, part in section, of a wet sorting plant of the well-known Rheolaveur'type for classifying minerals according to their densities and embodying the present invention;

Figure 2 is a plan view of the sorting apparatus shown in Figue 1 and taken along the line II—II of Figure 1;

Figure 3 is a sectional view taken transversely of one of the conveyors of invention and along the line III—III of Figure 2;

Figure 4 is an end view of the apparatus shown in Figure 1 with parts omitted and taken along the line IV—IV of that figure;

Figure 5 is a plan view of Figure 6;

Figure 6 is a view in elevation of the conveyer chain of invention, which is especially suitable for employment in the improved washing apparatus shown in the drawings, of which a part is shown in section; and Figure 7 is an enlarged view of a fragment of Figure 1 and showing the disposition of various parts for regulation and transportation of heavy materials discharged from the bottom of the launder.

The same characters of reference designate the same parts in each of the views of the drawings.

Referring now to the drawings, in its embodiment shown in Figures 1 and 2, the improvements provided by the present invention are shown in combination with a trough-like member or launder 10 in which a mixture comprising constituents of divers densities may be separated into fractions of higher and lower densities by introducing them into the upper part of said member 10 through chute 11 at which point they are picked up by a conveying stream of liquid, introduced into the launder at its head through the valved pipe 12, and carried down along the sloped surface thereof according to methods and in apparatus of the type patented in U. S. Patents 1,492,025; 1,508,176; 1,579,295; and granted to Antoine France under dates of April 29, 1924; September 9, 1924; and April 6, 1929, respectively. The materials being sorted proceed along said launder 10 conveyed by the liquid current wherein the rate of flow is so adjusted that lightest constituents tend to segregate in the uppermost part of the stream and to be borne therealong whereas the heaviest gravity constituents tend to sink into the lowest part where they move only sluggishly on the launder bottom. As the segregating constituents of the mixture being sorted approach upper discharge opening 13 of launder 10, the lowest layer comprising primarily only the densest constituents of the mixture reaches inclined and perforated plate 14, and as they move downward thereover they encounter an upwardly flowing current of the sorting liquid that flows into the discharge box 15 from valved pipe 16 by way of pocket 45 through perforated plate 46 and thence upward through said perforated plate 14 and discharge opening 13. This upwardly flowing current serves to return to the launder proper materials of lesser density that may have been entrained by the highest density products during the latter's segregation and so promotes efficiency of the sorting process. Flap valve 17, provided with an oscillatory motion by motor 18 through a lever linkage, as shown in the drawings, serves to assist directing the densest layer through the opening 13, the effective area of which is regulable by preferred adjustments of the position of hinged plate 19, that is rotatable about its supporting shaft but remains stationary during operation, relative to flap valve 17, and of the magnitude of the arc through which the latter oscillates. The effective area of opening 13 should be adequate to discharge the volume of sorted densest materials but inadequate to allow materials of lesser density passage therethrough. It is of course obvious that discharge box 15 is filled with the sorting liquid as is also the therewith communicating conveyor conduit or shell 24 and to a level that may be substantially equal to or even higher than that of the surface of the conveying-stream in the launder as is determined by the resistance met by the current of sorting liquid that flows upwardly through the discharge openings of the launders from the pipes 16.

These densest products thus selectively eliminated from launder 10 descend into the lower part of the liquid-filled discharge box and guided by the sloped surface 22 pass between the perforated spaced flights 23 of an endless scraper-conveyor, whereby said products are transported out of the discharge box upward along the bottom of the conduit or shell 24 for the scraper-conveyor, the sorting liquid being drained therefrom through the perforations of the conveyor flights. Upon arrival at the top of the conveyor-conduit the drained heavy gravity materials fall into the hopper 25 communicably connected with said conveyor-conduit whence they are distributed onto the diagrammatically illustrated cross-conveyor 26 for further transportation either to refuse or to an adjacent launder for further sorting, after optional crushing and depending upon how satisfactorily lighter products have been excluded therefrom.

Most of the lightest density products of the initial material along with so-called middlings, that is, such particles thereof as have a density intermediate of the extremes of density represented in the treated material, are carried over opening 13 of the launder and replaceable barrage 48, the height of which is adjusted to determine the density of materials that are arrested in the conveying-stream for discharge at a given opening, by the current of the liquid flowing therealong into the lower launder section where they are further treated to new conditions of stream-action such as will cause lightest gravity materials to continue to be carried in the stream but will allow remaining materials of higher than a chosen density to settle to the bottom of the launder and be eliminated therefrom through the lower opening thereof into box 27 by means similar to those already described in connection with opening 13 and its associated discharge box 15 up-stream thereof. This fraction eliminated from the lower opening of the launder is then elevated by the communicating scraper-conveyor 28 to the upper part of its surrounding conduit where it is discharged into hopper 29, communicably connected therewith, for further treatment. Either all or a portion of said fraction may be returned to the launder through chute 30.

These fractions of middle gravity may be crushed to reduce them to smaller sizes having diverse densities after which step they may be re-sorted in the same or in an adjacent launder, or, in some instances where an insufficiency thereof is present in the initial material to provide, for the sorting process, a stratum of intermediate density materials adequate to permit a satisfactorily sharp separation between the strata of lightest and heaviest constituents being easily made, a preferred and regulated quantity of said middlings is recycled in the sorting process by returning it to the head of the launder 10 to operate as regulatory material; the method and advantages resulting from such practice are clearly set forth more particularly in the aforementioned U. S. Patent No. 1,579,295. The lightest density materials are carried out of the launder at the open lower end 47 thereof with the flowing liquid and to any preferred process steps.

The scraper-conveyors are, according to the present invention, arranged in a novel and improved manner in respect of launder 10, as is clearly discernible in Figures 1 and 2, this new arrangement furnishing together with a more compact, rigid and durable unit that is more simply fabricated and erected at the point of installation, certain other advantages in operation of a washing unit embodying the improvement as well as in the results obtained.

According to the present improvement in apparatus for sorting minerals according to their densities in a flowing liquid, the endless elevator means, employed for lifting sorted fractions above the liquid level of the system and for transporting them to points for further disposition, are arranged in one plane that is inclined to the horizontal and intersects the launder in such manner that the upwardly and downwardly moving sections of the said endless conveyors are positioned on opposite sides of its associated launder, and they are further so arranged that in the course of their endless travel each conveyor passes transversely of the launder and preferably directly beneath an opening thereof through which sorted materials are regulably discharged, and thereafter passes transversely over the top of said launder at a preferred distance up-stream from said discharge opening, as is clearly disclosed in the accompanying drawings. Such arrangement of the conveying elevators makes it possible to introduce materials, discharged from the launder openings, by the shortest direct path into their conveyor means and to return them to the launder, when preferred, by the shortest possible route and with a minimum of required elevating and conveying, thereby protecting the treated materials from excessive travel and handling and consequent disintegration and with lowest possible consumption of power. To those familiar with the art it will be apparent that this simpler and novel arrangement of the required elevator-conveyors eliminates any need for communicably connecting said elevator-conveyors and discharge openings by means of the previously employed laterally-extending chutes which also required filling with an amount of the sorting liquid that constituted a significant part of the volume and the weight of the sorting liquid requiring storage in the system and for which adequate foundation supports had to be supplied. The invention provides, for all materials withdrawn through the discharge openings, the shortest most direct path possible to immediately adjacent conveyor means for transporting them, thereby reducing the required volume of recirculated sorting liquor maintained in the system and the height of the liquid heat that the materials of the conveyor conduits must support. The invention further advantageously eliminates from the flow-path, between the discharge openings of the launder and the conveyors, obstructing surfaces or structural features that tend to retard settling of the discharged materials onto the conveyors or that effect accumulations thereof in said flow-path as is the case when said materials are guided to the conveyors from the launder openings by laterally disposed chutes.

The conveyor means employed in the practise of the invention is preferably of the so-called scraper type and in the drawings there is shown an improved form thereof which is especially useful for the present application. Each scraper-conveyor comprises a multiplicity of perforated flights 23 that are joined together in spaced relationship by links 31, 32 to form an endless chain-like structure that is suspended by means of rider bars 36 from two parallel track-bars 33, 33, which are themselves supported near the tops of the conveyor conduits 24 on track-supports 34, 35. Hold-down bars 37 serve to limit the upward movement of the rider-bars and hold them contiguous to the track-bars 33. At spaced intervals along the conveyor-chain and mounted on bushings are rollers 38 that are of slightly less diameter than the distance between the inside vertical surfaces of the track-bars. These rollers operate to maintain the links of the conveyor-chain in alignment with said track-bars and to facilitate the sliding of the chain-structure around the curves of the track-bars. The endless chain of the scraper-conveyor is thus provided with a track that restricts it to a preferred orbit from which it cannot deviate at any point.

The conveyor conduits are each lined with easily replaceable metal plates 49 so that the outer shells thereof will not be worn through or develop leaks in consequence of the abrasive action of the materials handled.

The conveyors are each provided with individual driving means so that they are susceptible of independent operation, said driving means each comprising a motor 39, a speed-reducer 40, which is disposed to turn sprocket-wheels 41 through a shaft 42. The teeth of the sprocket-wheels are arranged to engage the conveyor chains in those spaces between the rollers 38 that are not occupied by rider bars. Each complete driving assembly is supported by a slideable cross-member 43 that itself is supported by the walls of its conveyor conduit 24. Take-up screws 44 permit adjustment of the position of the driving assembly and constitute means for tightening or loosening the conveyor chain. Any adjustments in the lengths of the conveyor-chains, it is obvious, require similar adjustments in the lengths of the supporting tracks 33 therefore so that joints are provided therein where shorter sections may be inserted or removed, as required.

As shown in the drawings, adjacent the heads of the launders, a section of the tracks for the endless chains of the scraper-conveyors is disposed at an acute angle to the longitudinal median of the launder by arranging the drive-shaft 42 of the sprocket-wheel at one side of said launder's median line. Through such arrangement of the tracks and the sprocket-wheels for driving the conveyors, it becomes possible and feasible to establish a standard driving unit and sprocket-wheel that is normally suitable for the majority of installations irrespective of the width of the launder. Thus, the same sized driving sprocket can be used with a launder the medians of the conveyor conduits for which are only removed substantially the diameter of said sprocket-wheel apart, and also with significantly wider launders whose conveyor-conduit medians are correspondingly remote from each other. This means that for the normal practical ranges in widths for launders of this type, a perfected scraper-conveyor unit can be made standard for all installations and with only relatively minor changes; the result being reduced costs for the engineering and design of an installation.

The novel and improved disposition in respect of sorting launders of their associated conveyors and the conduits therefor, provided by the invention, wherein each conveyor and its conduit embraces both sides of the launder and the conveyor itself is also brought closely adjacent to and directly beneath a launder discharge opening so that the materials removed thereby from said launder will pass straight into the conveyor directly, provides an improved compactness, rigidity and resistance to strain for a sorting unit. By reason of this improved arrangement of the required members it now becomes practical to weld the launder, its discharge boxes and the conveyor-conduits entirely from sheet metal together into one compact corporate whole having the obvious advantages residing in a consolidated structure. Furthermore, by means of the invention it is now feasible to join together all parts of the shell of a complete operating unit at the point of manufacture and also to install therein the various moving parts, to operate them and to make final adjustments and to ship said unit to the site of erection with only a minor dismantling. For example, such a sorting unit as shown in the drawings has been recently entirely assembled at the manufacturing plant and there operated and subsequently divided into two parts by cutting the launder along the line B—B and the resulting sections were then shipped as previously assembled to the construction site where said two sections were simply welded together after supporting on a foundation and the unit was immediately ready for operation.

The invention as hereinabove set forth is embodied in particular form and manner but may be variously embodied within the scope of the claims hereinafter made.

I claim:

1. Wet sorting apparatus for classification of minerals in a liquid stream comprising: an inclined launder having an upper and a lower evacuating box depending at spaced intervals, each of the boxes being provided at its lower part with a discharge chute and at its upper part with a valve-regulated discharge opening-means opening into the base of the launder and also with means at its upper part for supplying an upwardly flowing current through the opening means into the base of the launder, for discharge of sorted denser materials from the base of a stream of material in the launder into the lower chute part of the evacuating box; and sheathed elevator means individual to the respective evacuating boxes, the elevator means each comprising an endless chain conveyor rotatable in an inclined trough, with the boot or sump of the elevator means at the level of the lower part of the evacuating box beneath the level of the base of the launder, and the upper discharge head portion of the elevator means located upstream of the launder above the level of the upper surface of the upstream portion; and in which the lower chute portion of the evacuating boxes also constitutes the boot or sump for their respective elevator means; and in which the respective elevator means are disposed one above the other and each has its working strand and its trough on one side and its return strand on the opposite side of the launder; and in which the lower return bend portions of each of the endless chains extend across the launder underneath the same and are operatively disposed inside their lower chute boxes that constitute the boot or sump for their elevator means, so that the return bend portions of the chains themselves act in the lower chute portions to pick up the denser material in the lower chute portions; and in which the return bend portions of the chains at the heads of the elevator means also extend across the launder but over the upper surface of the upstream portion of the launder and have their upper head discharge portions adjacent the upper return bend portion of the endless chain.

2. Apparatus as claimed in claim 1, and in which each elevator means is provided with individual driving assembly therefor comprising a motor, a speed reducer, and sprocket wheel therefor for rotatable engagement with the endless chain, and in which each driving assembly is supported by a slidable plate slidably supported by the walls of its elevator, means adjacent the upper return bend portion of the endless chain, and take-up means are provided for such plate to slide the same on the elevator, means to adjust the take-up of the endless chain.

3. Apparatus as claimed in claim 1, and in which each elevator means is provided with individual driving assembly therefor comprising a motor, a speed reducer, and sprocket wheel therefor for rotatable engagement with the endless chain, and in which each driving assembly is supported by a slidable plate slidably supported by the walls of its elevator means adjacent the upper return bend portion of the endless chain, and take-up means are provided for such plate to slide the same on the elevator means to adjust the take-up of the endless chain, and in which the upper heads of the elevator means are disposed at an acute angle to the longitudinal median line of the launder, and the driving assembly is disposed at the axis of the angle whereby the construction may be built and used as a standard unit normally adaptable to various widths of different launders.

4. Apparatus as claimed in claim 1, and in which each elevator means is provided with individual driving assembly therefor comprising a motor, a speed reducer, and sprocket wheel therefor for rotatable engagement with the endless chain, and in which each driving assembly is supported by a slidable plate slidably supported by the walls of its elevator means adjacent the upper return bend portion of the endless chain, and take-up means are provided for such plate to slide the same on the elevator means to adjust the take-up of the endless chain, and in which the inclined elevator means for the upper and lower evacuating boxes are spaced from each other so that after being fully built into one corporate whole completely operative as an entity at the place of manufacture, the same may be cut into two independent but complete operative sections by severing the launder in the region thereof between the two elevator means, and separately shipped as previously assembled and reassembled for operation at the site for which it was constructed merely by re-uniting the several parts of the launder.

5. Apparatus as claimed in claim 1, and in which the endless chain structure comprises spaced flights connected by links, the links being suspended from rider-bars which are slidable along parallel track bars to thereby carry the load and in which idler rollers are carried along by the links, said idler rollers being spaced from the track to be free from supporting load, serving merely to maintain the endless chain in alignment.

6. Apparatus as claimed in claim 1, and in which the endless chain structure comprises spaced flights connected by links, the links being suspended from rider-bars which are slidable along parallel track bars to thereby carry the load and in which idler rollers are carried along by the links, said idler rollers being spaced from the track to be free from supporting load, serving merely to maintain the endless chain in alignment, and in which the lower return bend portions of the endless chains, that are in the portions of the lower chute parts of the evacuating boxes constituting the boots or sumps, are also constructed as aforesaid, but are disposed to one side of the opening of the valve-regulated opening-means of the evacuating box, and in which the endless chains are driven by driving means therefor operatively connected therewith at the head ends of the respective endless chains.

HOMER B. SLATER.